(12) United States Patent
Du et al.

(10) Patent No.: US 12,449,520 B2
(45) Date of Patent: Oct. 21, 2025

(54) AUTOMATIC DETECTION OF LIDAR TO VEHICLE ALIGNMENT STATE USING LOCALIZATION DATA

(71) Applicant: GM Global Technology Operations LLC, Detroit, MI (US)

(72) Inventors: Xinyu Du, Oakland Township, MI (US); Yao Hu, Sterling Heights, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 998 days.

(21) Appl. No.: 17/523,222

(22) Filed: Nov. 10, 2021

(65) Prior Publication Data

US 2023/0147739 A1 May 11, 2023

(51) Int. Cl.
*G01S 7/497* (2006.01)
*G01S 17/931* (2020.01)
*H04W 4/44* (2018.01)

(52) U.S. Cl.
CPC .......... *G01S 7/4972* (2013.01); *G01S 17/931* (2020.01); *H04W 4/44* (2018.02)

(58) Field of Classification Search
CPC ....................................................... G01S 7/4972
See application file for complete search history.

(56) References Cited

U.S. PATENT DOCUMENTS

| 11,465,642 | B2 * | 10/2022 | Xiao | ................... B60W 60/001 |
| 12,066,578 | B2 * | 8/2024 | Chen | ....................... G01S 17/42 |
| 2023/0147739 | A1 * | 5/2023 | Du | ......................... G01S 7/4972 356/4.01 |

* cited by examiner

*Primary Examiner* — Michael A Berns
(74) *Attorney, Agent, or Firm* — CANTOR COLBURN LLP

(57) ABSTRACT

A system in a vehicle includes a lidar system to obtain lidar data in a lidar coordinate system, and processing circuitry to obtain the lidar data and localization data. The localization data indicates a location and orientation of the vehicle. The processing circuitry automatically determines an alignment state resulting in a lidar-to-vehicle transformation matrix that projects the lidar data from the lidar coordinate system to a vehicle coordinate system to provide lidar-to-vehicle data. The alignment state is determined using the localization data.

20 Claims, 6 Drawing Sheets

AUTOMATIC DETECTION OF LIDAR TO VEHICLE ALIGNMENT STATE USING LOCALIZATION DATA

INTRODUCTION

The subject disclosure relates to automatic detection of lidar to vehicle alignment state using localization data.

Vehicles (e.g., automobiles, trucks, construction equipment, farm equipment) increasingly include sensors that obtain information about the vehicle and its environment. The information facilitates semi-autonomous or autonomous operation of the vehicle. For example, sensors (e.g., camera, radar system, lidar system, inertial measurement unit (IMU), steering angle sensor) may facilitate semi-autonomous maneuvers such as automatic braking, collision avoidance, or adaptive cruise control. Generally, sensors like cameras, radar systems, and lidar systems have a coordinate system that differs from the vehicle coordinate system. The sensor coordinate system must be properly aligned with the vehicle coordinate system to obtain information from the sensor that is easily applicable to vehicle operation. Accordingly, it is desirable to provide automatic detection of lidar to vehicle alignment state using localization data.

SUMMARY

In one exemplary embodiment, a system in a vehicle includes a lidar system to obtain lidar data in a lidar coordinate system and processing circuitry to obtain the lidar data and localization data. The localization data indicates a location and orientation of the vehicle. The processing circuitry automatically determines an alignment state resulting in a lidar-to-vehicle transformation matrix that projects the lidar data from the lidar coordinate system to a vehicle coordinate system to provide lidar-to-vehicle data. The alignment state is determined using the localization data.

In addition to one or more of the features described herein, the processing circuitry obtains a vehicle-to-world transformation matrix to project data from the vehicle coordinate system to a world coordinate system, which is a fixed coordinate system, based on the localization.

In addition to one or more of the features described herein, the processing circuitry obtains a plurality of frames of lidar data at corresponding time stamps, determines transformation matrices, each transformation matrix being between a first of the plurality of frames of lidar data and a subsequent one of the plurality of frames of lidar data, and obtains a residual sum based on the transformation matrices, lidar-to-vehicle transformation matrix for each frame, and the vehicle-to-world transformation matrix for each frame.

In addition to one or more of the features described herein, the processing circuitry determines the alignment state as aligned based on an average of the residual sum for each frame being less than or equal to a threshold value.

In addition to one or more of the features described herein, the processing circuitry aggregates a plurality of frames of lidar data at corresponding time stamps to obtain aggregated lidar data, to use the lidar-to-vehicle transformation matrix and the vehicle-to-world transformation matrix to obtain the aggregated lidar data in the world coordinate system, and to identify at least a predefined minimum number of objects.

In addition to one or more of the features described herein, the processing circuitry performs principal component analysis or a determination of density for points of the aggregated lidar data based on a type of object among the at least the predefined minimum number of objects associated with the points and determines the alignment state based on a minimum eigenvalue resulting from the principal component analysis or the density.

In addition to one or more of the features described herein, the processing circuitry aggregates a plurality of frames of lidar data at corresponding time stamps to obtain aggregated lidar data, uses the lidar-to-vehicle transformation matrix and the vehicle-to-world transformation matrix to obtain the aggregated lidar data in the world coordinate system, and identifies objects in the aggregated lidar data in the world coordinate system.

In addition to one or more of the features described herein, the processing circuitry obtains a high definition map, a pre-saved point cloud indicating stationary objects, or obtains vehicle-to-everything (V2X) communication, identifies one or more objects as ground truth objects, and determines the alignment state based on a distance between the objects identified in the aggregated lidar data and corresponding ones of the ground truth objects.

In addition to one or more of the features described herein, the processing circuitry trains a deep learning neural network based on collecting lidar data, localization data, and an aligned lidar-to-vehicle transformation matrix, injecting different levels of alignment fault into the collected lidar data to generate modified lidar data and labeling the modified lidar data according to the alignment fault, and implements supervised learning to train the deep learning neural network to classify alignment as good or faulty.

In addition to one or more of the features described herein, the processing circuitry aggregates a plurality of frames of lidar data at corresponding time stamps to obtain aggregated lidar data, uses the lidar-to-vehicle transformation matrix and the vehicle-to-world transformation matrix to obtain the aggregated lidar data in the world coordinate system, implements the deep learning neural network, and determines the alignment state based on the indication of the alignment as good or faulty.

In another exemplary embodiment, a method in a vehicle includes obtaining, by processing circuitry from a lidar system, lidar data in a lidar coordinate system, and obtaining, by the processing circuitry, localization data, wherein the localization data indicates a location and orientation of the vehicle. The method also includes automatically determining, by the processing circuitry, an alignment state resulting in a lidar-to-vehicle transformation matrix that projects the lidar data from the lidar coordinate system to a vehicle coordinate system to provide lidar-to-vehicle data. The alignment state is determined using the localization data.

In addition to one or more of the features described herein, the method also includes the processing circuitry obtaining a vehicle-to-world transformation matrix to project data from the vehicle coordinate system to a world coordinate system, which is a fixed coordinate system, based on the localization.

In addition to one or more of the features described herein, the method also includes the processing circuitry obtaining a plurality of frames of lidar data at corresponding time stamps, determining transformation matrices, each transformation matrix being between a first of the plurality of frames of lidar data and a subsequent one of the plurality of frames of lidar data, and obtaining a residual sum based on the transformation matrices, lidar-to-vehicle transformation matrix for each frame, and the vehicle-to-world transformation matrix for each frame.

In addition to one or more of the features described herein, the determining the alignment state includes determining that the alignment state is aligned based on an average of the residual sum for each frame being less than or equal to a threshold value.

In addition to one or more of the features described herein, the method also includes the processing circuitry aggregating a plurality of frames of lidar data at corresponding time stamps to obtain aggregated lidar data, using the lidar-to-vehicle transformation matrix and the vehicle-to-world transformation matrix to obtain the aggregated lidar data in the world coordinate system, and identifying at least a predefined minimum number of objects.

In addition to one or more of the features described herein, the method also includes the processing circuitry performing principal component analysis or a determination of density for points of the aggregated lidar data based on a type of object among the at least the predefined minimum number of objects associated with the points and determining the alignment state based on a minimum eigenvalue resulting from the principal component analysis or the density.

In addition to one or more of the features described herein, the method also includes the processing circuitry aggregating a plurality of frames of lidar data at corresponding time stamps to obtain aggregated lidar data, using the lidar-to-vehicle transformation matrix and the vehicle-to-world transformation matrix to obtain the aggregated lidar data in the world coordinate system, and identifying objects in the aggregated lidar data in the world coordinate system.

In addition to one or more of the features described herein, the method also includes the processing circuitry obtaining a high definition map, a pre-saved point cloud indicating stationary objects, or vehicle-to-everything (V2X) communication, identifying one or more objects as ground truth objects, and determining the alignment state based on a distance between the objects identified in the aggregated lidar data and corresponding ones of the ground truth objects.

In addition to one or more of the features described herein, the method also includes the processing circuitry training a deep learning neural network based on collecting lidar data, localization data, and an aligned lidar-to-vehicle transformation matrix, injecting different levels of alignment fault into the collected lidar data to generate modified lidar data and labeling the modified lidar data according to the alignment fault, and implementing supervised learning to train the deep learning neural network to classify alignment as good or faulty.

In addition to one or more of the features described herein, the method also includes the processing circuitry aggregating a plurality of frames of lidar data at corresponding time stamps to obtain aggregated lidar data, using the lidar-to-vehicle transformation matrix and the vehicle-to-world transformation matrix to obtain the aggregated lidar data in the world coordinate system, implementing the deep learning neural network, and determining the alignment state based on the indication of the alignment as good or faulty.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
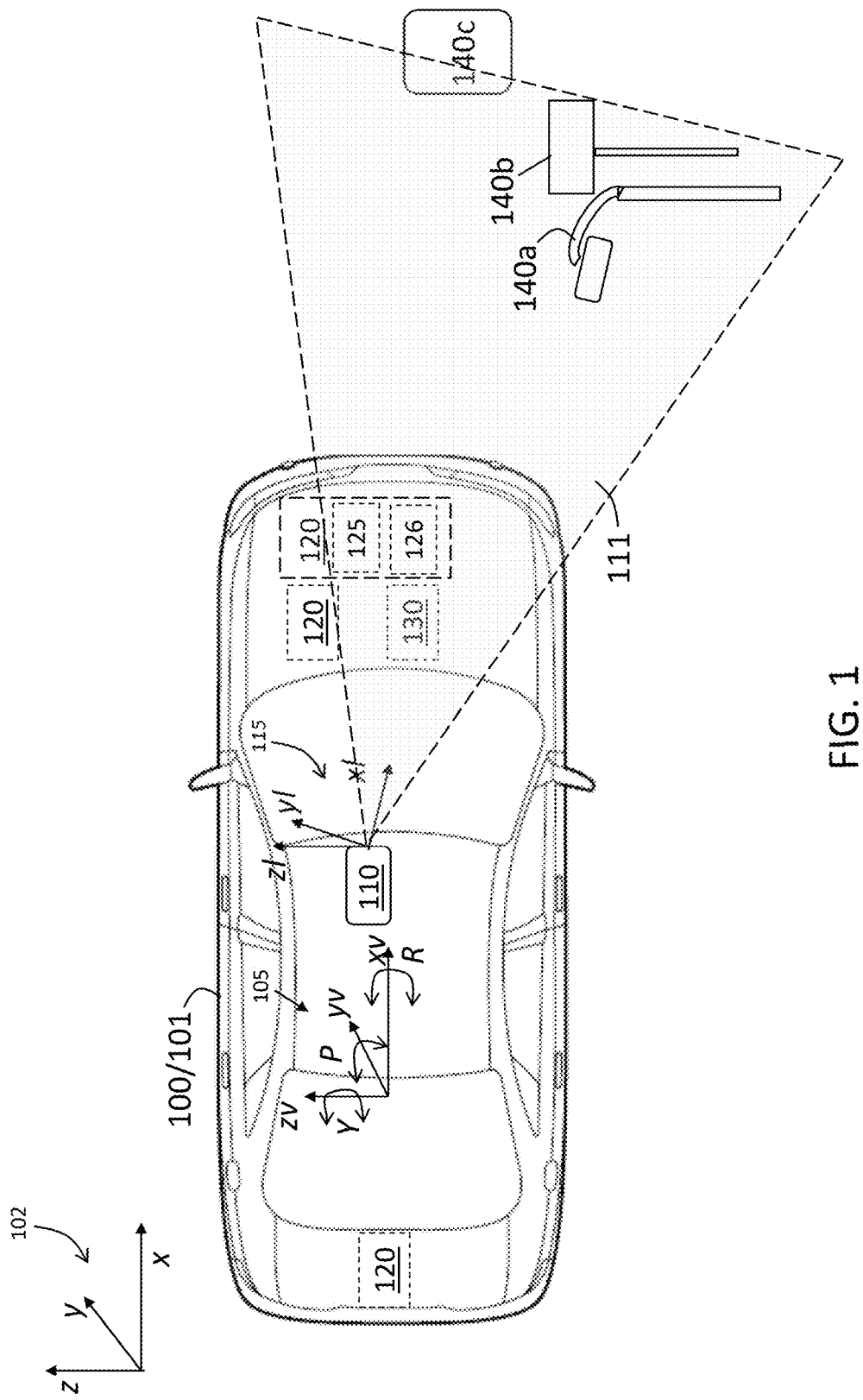
FIG. 1 is a block diagram of a vehicle including automatic detection of lidar to vehicle alignment state according to one or more embodiments.

The following description is merely exemplary in nature and is not intended to limit the present disclosure, its application or uses. It should be understood that throughout the drawings, corresponding reference numerals indicate like or corresponding parts and features.

As previously noted, sensors like the lidar system have a coordinate system that is different than the vehicle coordinate system. Thus, information (e.g., location of objects around the vehicle) from the lidar system must be projected to the vehicle coordinate system through a transformation matrix in order to use the information to control vehicle operation in a straight-forward way. The transformation matrix is essentially a representation of the alignment between the two coordinate systems. That is, the alignment process is the process of finding the transformation matrix. Thus, the transformation matrix correctly projects the lidar information to the vehicle coordinate system when the two coordinate systems are properly aligned, and the transformation matrix does not project the lidar information to the vehicle coordinate system correctly when the two coordinate systems are misaligned. Knowing the alignment state (i.e., aligned or misaligned) is important for correcting the transformation matrix as needed. Further, monitoring the alignment state over time (e.g., dynamically detecting the alignment state) is important because ageing, vibration, an accident, or other factors may change the alignment state.

A prior approach to ensuring alignment between the lidar system and the vehicle involves manually observing lidar point clouds in the lidar coordinate system and those same lidar point clouds projected to the vehicle coordinate system to determine if there is a misalignment in the transformation matrix that is visible in the projected lidar point clouds. This approach has several drawbacks including the time required and the fact that the assessment does not lend itself to being performed in real-time during vehicle operation. Embodiments of the systems and methods detailed herein relate to automatic detection of lidar to vehicle alignment state (i.e., aligned or misaligned) using localization data. Localization data indicates the location and orientation of the vehicle.

In accordance with an exemplary embodiment, FIG. 1 is a block diagram of a vehicle 100 including automatic detection of lidar to vehicle alignment state. Detecting the alignment state refers to determining whether the existing transformation matrix projects data from the lidar coordinate system 115 to the vehicle coordinate system 105 correctly (i.e., alignment state is aligned) or not (i.e., alignment state is misaligned). The exemplary vehicle 100 shown in FIG. 1 is an automobile. The vehicle 100 is shown to include a lidar system 110 that has the lidar coordinate system 115. The world coordinate system 102 is shown in addition to the vehicle coordinate system 105 and lidar coordinate system 115. The world coordinate system 102 is unchanging while the other coordinate systems 105, 115 may shift with the motion of the vehicle 100. Three exemplary objects 140a, 140b, 140c (generally referred to as 140) are shown. Object 140a is a light pole, and object 140b is a traffic sign. Object 140c may be another car or a pedestrian, for example.

While one lidar system 110 is shown, the exemplary illustration is not intended to be limiting with respect to the numbers or locations of lidar systems 110. The vehicle 100 may include any number of lidar systems 110 or other sensors 120 (e.g., camera, radar systems, IMU 126, global navigation satellite system (GNSS) such as global positioning system (GPS) 125) at any location around the vehicle 100. The other sensors 120 may provide localization information (e.g., location and orientation of the vehicle 100), for example. The motions associated with yaw Y, pitch P, and roll R are indicated. A yaw angle is an angle between the direction of travel of the vehicle 100 and its x-axis xv and rotates around the z-axis vz of the vehicle 100, while a pitch angle is relative to the y-axis vy of the vehicle 100 and a roll angle is relative to the z-axis vz of the vehicle 100 and rotates around the x-axis xv. This information may be obtained using other sensors 120 such as GPS 125 and IMU 126.

In addition, the coordinate systems 105, 115 shown in FIG. 1 are exemplary. Further, while three exemplary objects 140 are shown in FIG. 1, any number of objects 140 may be detected by one or more sensors. An exemplary lidar field of view (FOV) 111 is outlined. As previously noted, a transformation matrix facilitates the projection of data from one coordinate system to another. As also noted, the process of aligning two coordinate systems is the processing of determining the transformation matrix to project data from one coordinate system to the other. A misalignment refers to an error in that transformation matrix.

The vehicle 100 includes a controller 130 that controls one or more operations of the vehicle 100. The controller 130 may perform the alignment process between the lidar system 110 and the vehicle 100 (i.e., determine the transformation matrix between the lidar coordinate system 115 and the vehicle coordinate system 105). The controller 130 may also perform communication with other vehicles in the form of vehicle-to-vehicle (V2V) messages, with infrastructure in the form of vehicle-to-infrastructure (V2I) messages, and with a cloud server or any other system, generally, via vehicle-to-everything (V2X) messages. This is further discussed with reference to FIG. 5. The controller 130 may additionally perform training and implementation of machine learning (e.g., a deep learning neural network). This is further discussed with reference to FIG. 6.

The controller 130 may additionally implement the processes discussed with reference to FIGS. 2-6 to determine an alignment state between the lidar system 110 and the vehicle 100. According to different exemplary embodiments, the controller 130 may implement one of the methods discussed with reference to FIGS. 2-6 or may implement two or more of the methods in parallel. The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
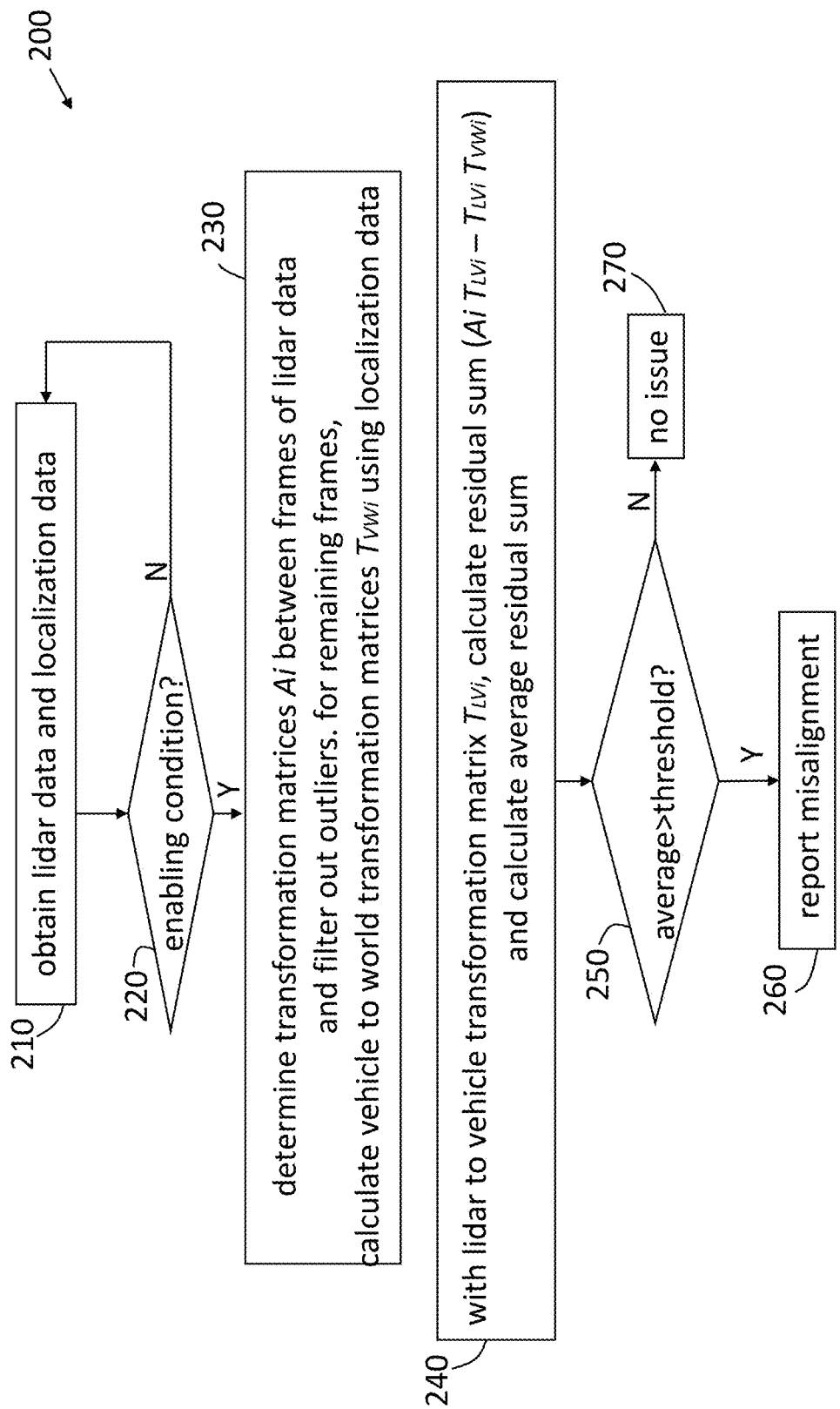
FIG. 2 is a process flow of a method of performing automatic detection of the alignment state between a lidar coordinate system and a vehicle coordinate system according to an exemplary embodiment.

FIG. 2 is a process flow of a method 200 of performing automatic detection of the alignment state between a lidar coordinate system 115 and a vehicle coordinate system 105 according to an exemplary embodiment. The embodiments discussed with reference to FIGS. 2-6 rely on localization data (e.g., position and orientation of the vehicle 100) obtained in the world coordinate system 102. This localization data may be obtained based on one of the other sensors 120 being a GPS 125, for example.

At block 210, the processes include obtaining lidar data from the lidar system 110 and localization data from a GPS 125 and IMU 126, for example. At block 220, a check is done to determine if an enabling condition is met. An enabling condition refers to a maneuver such as a U-turn, right turn, or left turn. The enabling condition may be quantified as one during which the yaw angle is greater than a predefined threshold (e.g., 90 degrees) and the translation of the vehicle (e.g., changes in xv and yv) is greater than a predefined threshold (e.g., 20 meters). If the check at block 220 indicates that enabling condition is not met, then the processes of obtaining lidar data and localization data (at block 210) continue. If, according to the check at block 220, the enabling condition is met (i.e., the vehicle 100 is performing a maneuver that facilitates this alignment status determination according to the method 200), then the processes at block 230 are performed.

At block 230, for a series of frames of lidar data (obtained at block 210 over a set of time stamps, indicated with index i), the transformation matrices Ai between the first frame and each of the subsequent frames are determined. This is done by known techniques referred to as lidar registration such as laser odometry and mapping (LOAM), iterative closest point (ICP), generalized ICP (GICP), and normal distributions transform (NDT). Outliers are then filtered out. That is, a smooth movement of the vehicle 100 is assumed during the enabling condition (e.g., U-turn). Thus, any one of the transformation matrices Ai that projects data outside a predefined range defined by an extrapolation result between frames is regarded as an outlier. Thus, after the outlier frames and corresponding ones of the transformation matrices Ai are removed, remaining transformation matrices Ai are retained.

Continuing the discussion of processes at block 230, for the frames for which transformation matrices Ai are retained, vehicle-to-world transformation matrices $T_{VWi}$ are obtained based on localization data. That is, yaw, pitch, and roll angles that make up the rotation matrix R and components Tx, Ty, Tz of a translation matrix T are obtained, for each frame indicated with index i, from other sensors 120 such as the GPS 125 and IMU 126. Then, the vehicle-to-world transformation matrices $T_{VWi}$ are obtained as:

$$T_{VWi} = \begin{bmatrix} R & T \\ 0 & 1 \end{bmatrix} \quad\quad \text{[EQ. 1]}$$

At block 240, the lidar-to-vehicle transformation matrix $T_{LV}$, which represents the alignment whose state is of interest, is used to calculate a residual sum $S_i$ for each pair of transformation matrices Ai and $T_{VWi}$:

$$S_i = (A_i T_{LV} - T_{LV} T_{VWi})$$ [EQ. 2]

An average of the residual sums is also determined. At block 250, a check is done of whether the average residual sum exceeds a predefined threshold. If it does, then a misalignment is reported as the alignment state, at block 260. If, instead, the check at block 250 indicates that the average residual sum does not exceed the threshold, then alignment is determined as the alignment state, at block 270.

Figure 3:
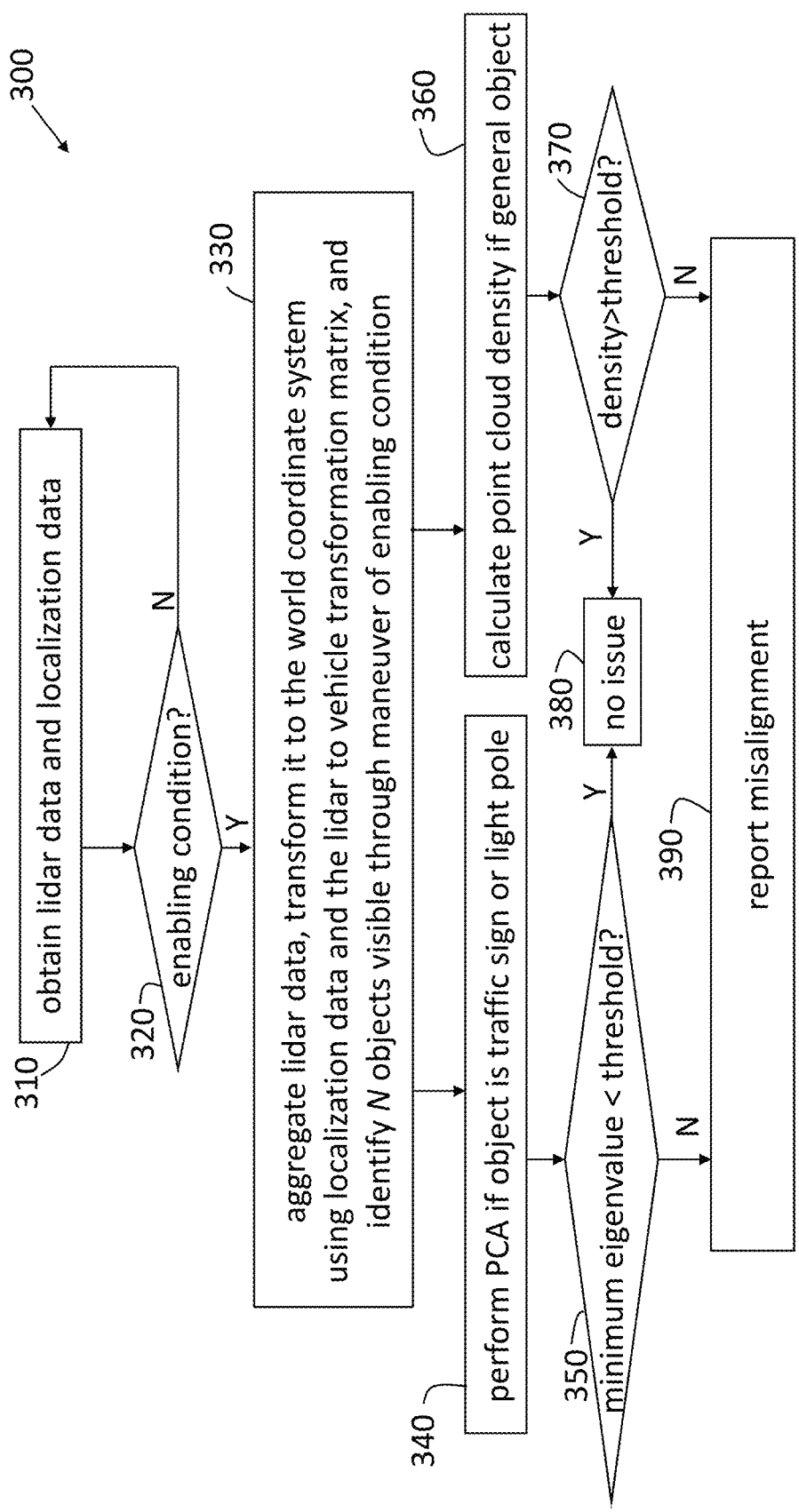
FIG. 3 is a process flow of a method of performing automatic detection of the alignment state between a lidar coordinate system and a vehicle coordinate system according to another exemplary embodiment.

FIG. 3 is a process flow of a method 300 of performing automatic detection of the alignment state between a lidar coordinate system 115 and a vehicle coordinate system 105 according to another exemplary embodiment. At block 310, the processes include obtaining lidar data from the lidar system 110 and localization data, and, at block 320, the processes include checking whether an enabling condition is met. These processes are similar to the processes at blocks 210 and 220, discussed with reference to FIG. 2. If the check at block 320 indicates that enabling condition is not met, then the processes of obtaining lidar data and localization data (at block 310) continue. If, according to the check at block 320, the enabling condition is met (i.e., the vehicle 100 is performing a maneuver that facilitates this alignment status determination according to the method 300), then the processes at block 330 are performed.

At block 330, the processes include aggregating the lidar data obtained at block 310, transforming the lidar data to the world coordinate system 102, and identifying at least a minimum number N of objects 140 (e.g., N≥3) visible through the maneuver of the enabling condition identified at block 320. The lidar data L (i.e., point cloud obtained by the lidar system 110) transformed to the world coordinate system 102 $L_W$ is obtained as:

$$L_W = T_{VW} T_{LV} L$$ [EQ. 3]

As noted with reference to FIG. 2, $T_{VW}$ is the vehicle-to-world transformation matrix and $T_{LV}$ is the lidar-to-vehicle transformation matrix, which represents the alignment whose state is of interest. The aggregation at block 330 refers to concatenating the lidar data in the world coordinate system 102 $L_W$. Identifying at least the minimum number N of objects 140 in the concatenated lidar data in the world coordinate system 102 $L_W$ may entail using a known identification technique with some additional conditions. The conditions may include a minimum number of points of the point cloud, for example. Identifying the objects 140, at block 330, includes determining if each of the N objects 140 is a light pole (object 140a) or traffic sign (object 140b).

At block 340, performing principal component analysis (PCA) is only done for points of the aggregated lidar data (i.e., point cloud) associated with each object 140 that is determined to be either a light pole (object 140a) or traffic sign (object 140b) at block 330. Performing PCA on the points of the lidar data results in obtaining three eigenvalues corresponding to eigenvectors that indicate vagueness in the object 140. At block 350, a check is done of whether the minimum eigenvalue is less than a threshold. If it is, then alignment is determined as the alignment state, at block 380.

If, on the other hand, the check at block 350 indicates that the minimum eigenvalue is not less than the threshold, then misalignment is reported as the alignment state, at block 390. According to an exemplary embodiment, the outcome based on the check at block 350 may be sufficient. According to alternate embodiments, the processes at block 360 and the check at block 370 may be additionally or alternately performed. When the check at block 370 is additionally performed, a misalignment may only be reported, at block 390, if both the checks and blocks 350 and 370 indicate misalignment (i.e., both checks reach block 390).

At block 360, calculating point cloud density is done for points of the aggregated lidar data (i.e., point cloud) associated with each object 140 that is determined not to be a light pole (object 140a) or traffic sign (object 140b) at block 330. Calculating the point cloud density may be performed according to different exemplary embodiments. According to an exemplary embodiment, a set (e.g., 20) of the nearest points to any point associated with the object 140 that is not a light pole (object 140a) or traffic sign (object 140b) may be selected. The density may be determined as the inverse of an average distance from the point to each of the set of the nearest points. According to another exemplary embodiments, the density may be calculated based on the number of other points within a distance (e.g., 1 meter) of the point associated with the object 140 that is not a light pole (object 140a) or traffic sign (object 140b). According to yet another exemplary embodiment, the density may be computed from the sum of the three eigenvalues obtained by performing a singular value decomposition of a set (e.g., 20) of points associated with the object 140 that is not a light pole (object 140a) or traffic sign (object 140b). At block 370, a check is done of whether the density is greater than a threshold density. If it is, then alignment is determined as the alignment state, at block 380. If, on the other hand, the check at block 370 indicates that the density does not exceed the threshold density, then misalignment is reported as the alignment state, at block 390.

Figure 4:
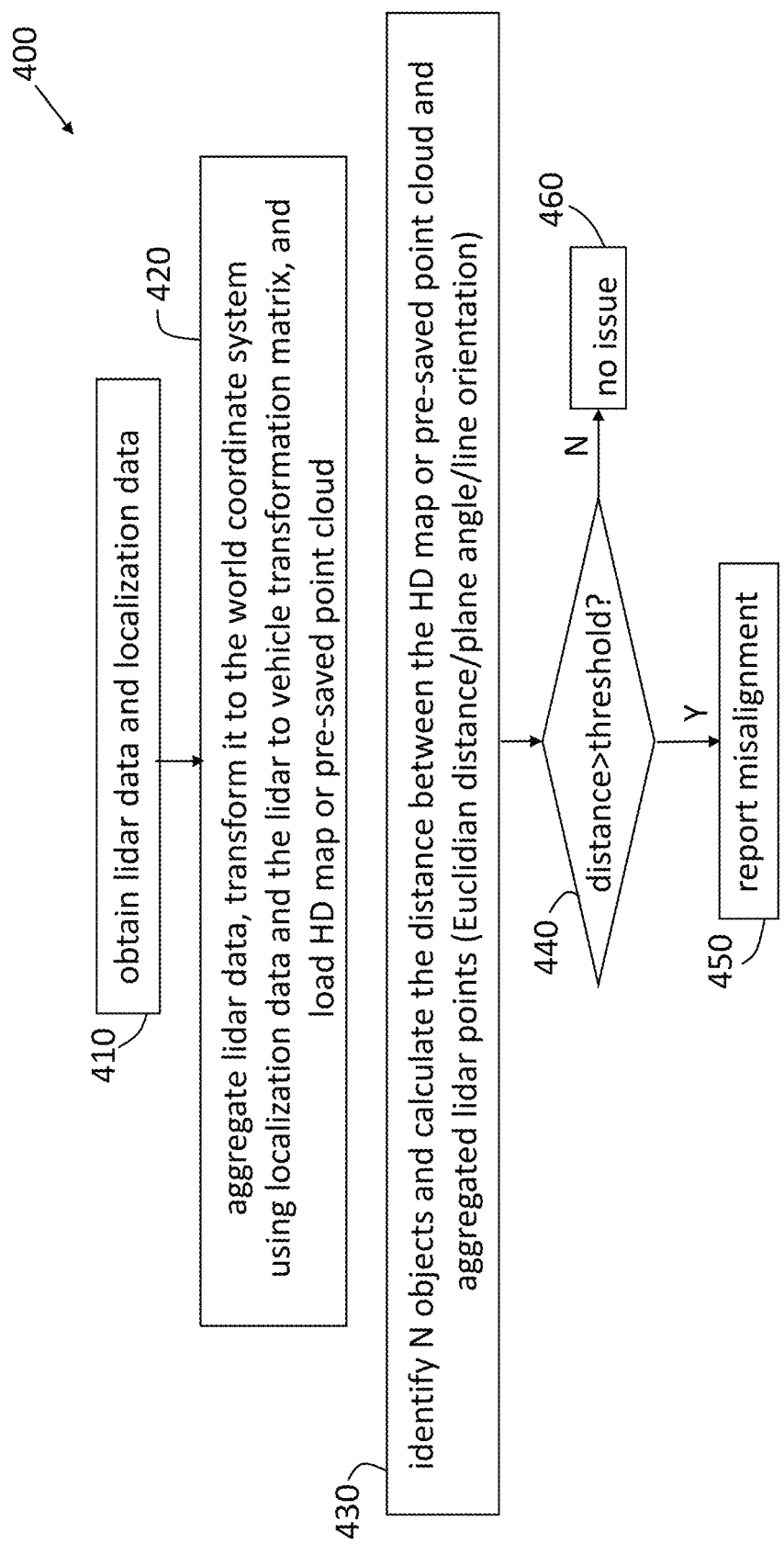
FIG. 4. is a process flow of a method of performing automatic detection of the alignment state between a lidar coordinate system and a vehicle coordinate system according to another exemplary embodiment.

FIG. 4 is a process flow of a method 400 of performing automatic detection of the alignment state between a lidar coordinate system 115 and a vehicle coordinate system 105 according to another exemplary embodiment. At block 410, the processes include obtaining lidar data from the lidar system 110 and localization data from the GPS 125 and the IMU 126, for example. At block 420, the processes include aggregating the lidar data obtained at block 410, transforming it to the world coordinate system according to EQ. 3, and loading a high definition (HD) map or pre-saved point cloud that represents ground truth and indicates stationary objects 140 in the current vicinity of the vehicle 100.

At block 430, the processes include identifying more than a minimum number N of objects 140 (e.g., N>3) in the aggregated lidar data that are indicated on the HD map or in the pre-saved point cloud of the objects and calculating the distance between points of the lidar data corresponding to the objects 140 and associated points in the HD map or pre-saved point cloud. The distance may be calculated in terms of Euclidian distance, plane angle, or line orientation, for example. At block 440, a check is done of whether the distances between any associated points exceed a threshold distance. If they do not, then alignment is determined as the alignment state, at block 460. If, on the other hand, the check at block 440 indicates that the distance between any associated points exceeds the threshold distance, then misalignment is reported as the alignment state, at block 450.

Figure 5:
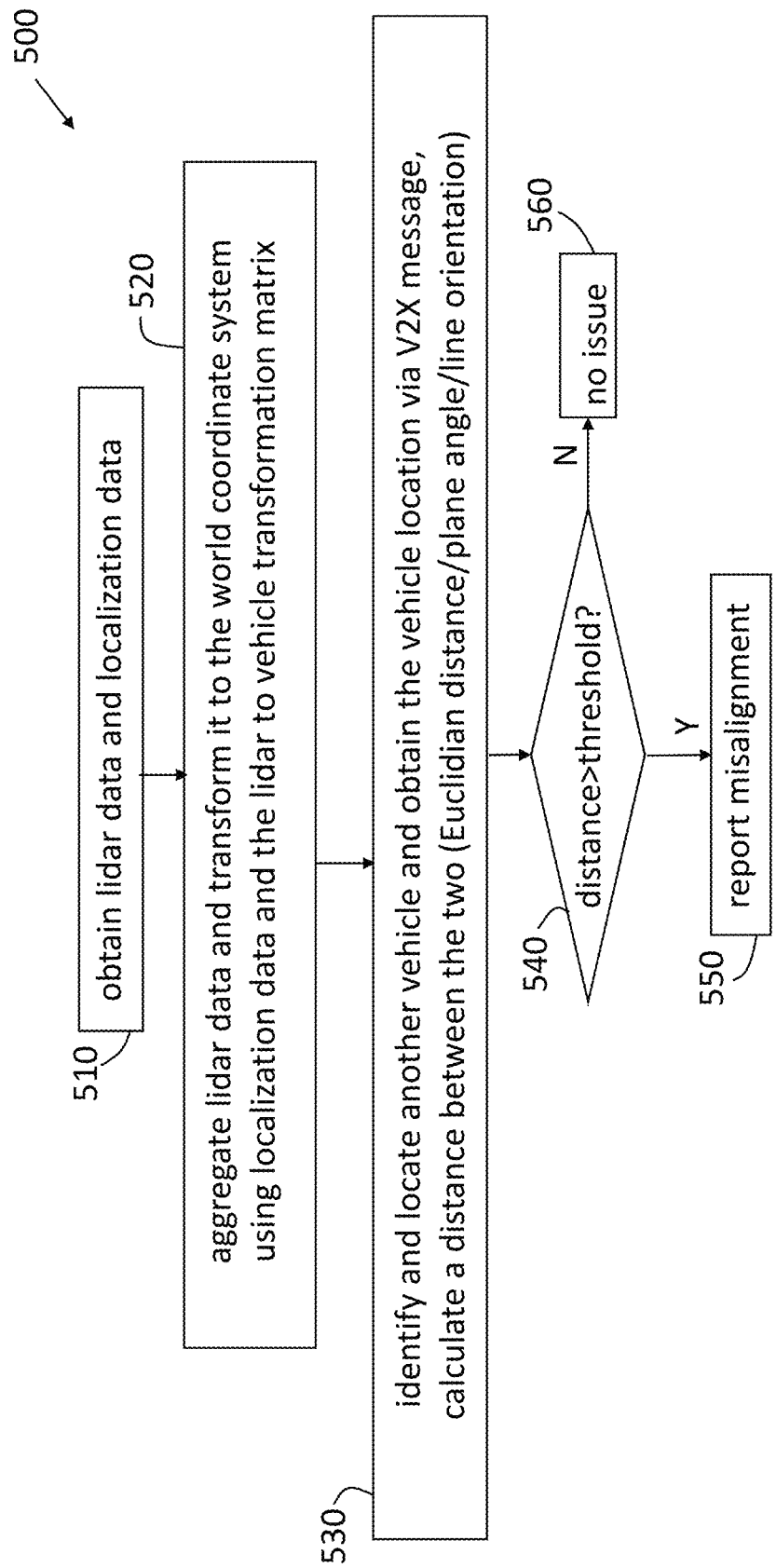
FIG. 5 is a process flow of a method of performing automatic detection of the alignment state between a lidar coordinate system and a vehicle coordinate system according to another exemplary embodiment.

FIG. 5 is a process flow of a method 500 of performing automatic detection of the alignment state between a lidar coordinate system 115 and a vehicle coordinate system 105 according to another exemplary embodiment. At block 510, the processes include obtaining lidar data from the lidar system 110 and localization data from the GPS 125, for example. At block 520, the processes include aggregating the lidar data obtained at block 510 and transforming it to the world coordinate system according to EQ. 3.

At block 530, the processes include identifying and locating another vehicle (object 140) in the aggregated lidar data in the world coordinate system and also obtaining the location of the other vehicle via a V2X message. The processes at block 530 then include calculating the distance between the locations obtained via points of the lidar data corresponding to the other vehicle and via the V2X message. The distance may be calculated in terms of Euclidian distance, plane angle, or line orientation, for example. At block 540, a check is done of whether the distance exceeds a threshold distance. If it does not, then alignment is determined as the alignment state, at block 560. If, on the other hand, the check at block 540 indicates that the distance exceeds the threshold distance, then misalignment is reported as the alignment state, at block 550.

Figure 6:
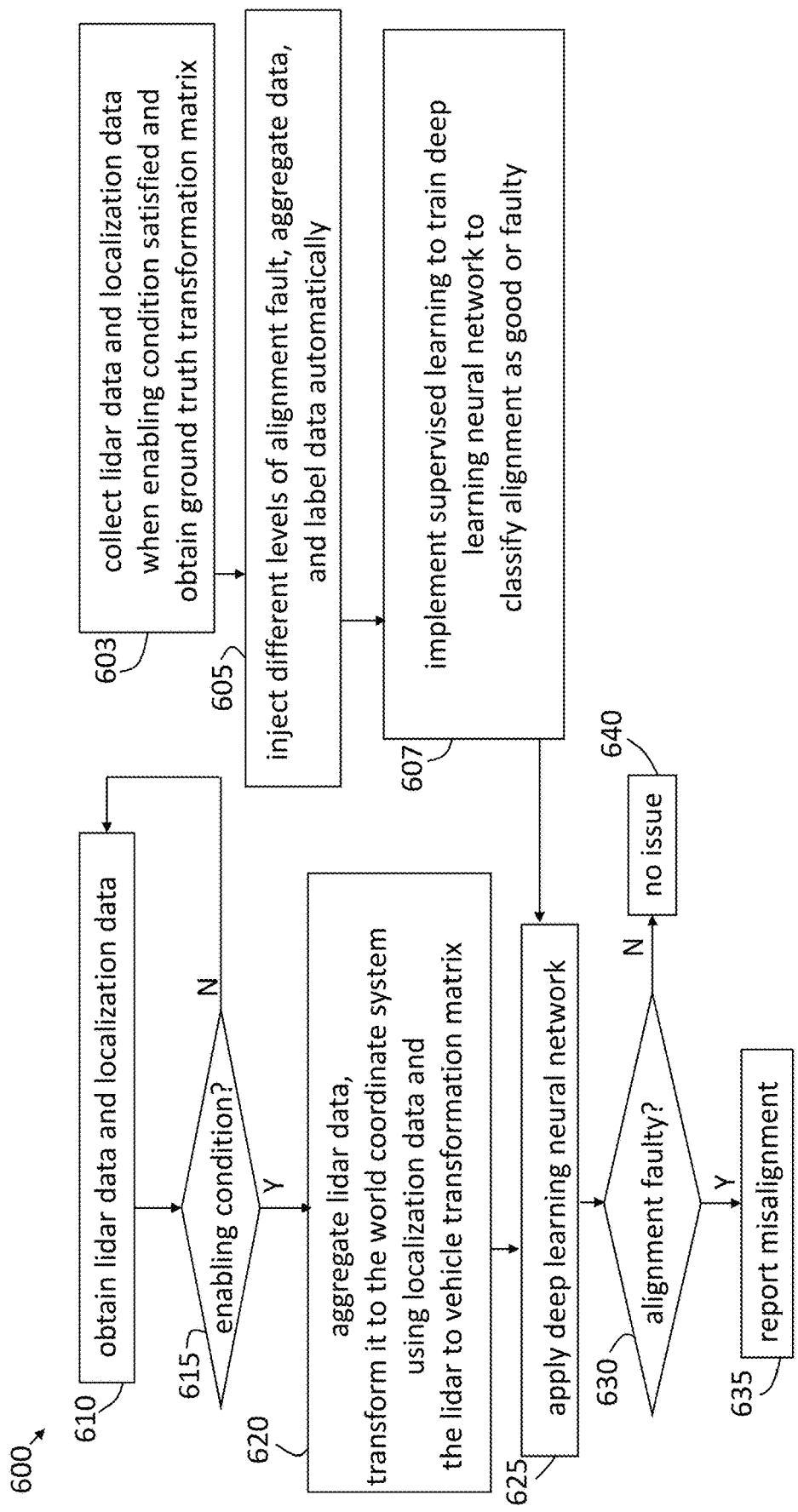
FIG. 6 is a process flow of a method of performing automatic detection of the alignment state between a lidar coordinate system and a vehicle coordinate system according to another exemplary embodiment.

FIG. 6 is a process flow of a method 600 of performing automatic detection of the alignment state between a lidar coordinate system 115 and a vehicle coordinate system 105 according to another exemplary embodiment. The method 600 requires processes (at blocks 603, 605, 607) to train a deep learning neural network. At block 603, the processes include collecting lidar data and localization data when an enabling condition is satisfied (according to the discussion with reference to FIG. 2 or 3, for example) and additionally obtaining a ground truth transformation matrix (i.e., an aligned transformation matrix). At block 605, the processes include injecting different levels of alignment fault (i.e., changing the aligned transformation matrix to different degrees), aggregating the transformed data, and labeling the data automatically according to the injected fault (e.g., aligned, not aligned). An exemplary alignment fault may involve adding 1 degree to the yaw, for example. At block 607, the processes include implementing supervised learning to train the deep learning neural network to classify the alignment as good or faulty. Once the training is performed, the deep learning neural network may be implemented to automatically assess the state of alignment. That is, the training may be performed offline prior to implementation in the vehicle 100.

At block 610, the processes include obtaining lidar data from the lidar system 110 and localization data from the GPS 125 and the IMU 126, for example. At block 615, the processes include checking whether an enabling condition is met. These processes are similar to the processes at blocks 210 and 220, discussed with reference to FIG. 2. At block 620, the processes include aggregating the lidar data obtained at block 610 and transforming the aggregated lidar data to the world coordinate system using EQ. 3. At block 625, applying the deep neural network that was trained according to the processes at blocks 603, 605, 607 facilitates obtaining an indication, at block 630, of whether the alignment is good or faulty. If the alignment is indicated as faulty, at block 630, then misalignment is reported as the alignment state, at block 635. If, on the other hand, the alignment state is not indicated as faulty, at block 630, then alignment is determined as the alignment state, at block 640.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in a vehicle comprising:
a lidar system configured to obtain lidar data in a lidar coordinate system; and
processing circuitry configured to obtain the lidar data and localization data, wherein the localization data indicates a location and orientation of the vehicle, and to automatically determine an alignment state resulting in a lidar-to-vehicle transformation matrix that projects the lidar data from the lidar coordinate system to a vehicle coordinate system to provide lidar-to-vehicle data, wherein the alignment state is determined using the localization data;
wherein the processing circuitry obtains a vehicle-to-world transformation matrix to project data from the vehicle coordinate system to a world coordinate system, which is a fixed coordinate system, based on the localization data; and
wherein the processing circuitry is configured to aggregate a plurality of frames of lidar data at corresponding time stamps to obtain aggregated lidar data, to use the lidar-to-vehicle transformation matrix and the vehicle-to-world transformation matrix to obtain the aggregated lidar data in the world coordinate system.

2. The system according to claim 1, wherein the processing circuitry is configured to obtain a plurality of frames of lidar data at corresponding time stamps, to determine transformation matrices, each transformation matrix being between a first of the plurality of frames of lidar data and a subsequent one of the plurality of frames of lidar data, and to obtain a residual sum based on the transformation matrices, lidar-to-vehicle transformation matrix for each frame, and the vehicle-to-world transformation matrix for each frame.

3. The system according to claim 2, wherein the processing circuitry determines the alignment state as aligned based on an average of the residual sum for each frame being less than or equal to a threshold value.

4. The system according to claim 1, wherein the processing circuitry is configured to identify at least a predefined minimum number of objects.

5. The system according to claim 4, wherein the processing circuitry is configured to perform principal component analysis or a determination of density for points of the aggregated lidar data based on a type of object among the at least the predefined minimum number of objects associated with the points and to determine the alignment state based on a minimum eigenvalue resulting from the principal component analysis or the density.

6. The system according to claim 1, wherein the processing circuitry is configured to identify objects in the aggregated lidar data in the world coordinate system.

7. The system according to claim 6, wherein the processing circuitry is configured to obtain a high definition map, a pre-saved point cloud indicating stationary objects, or obtains vehicle-to-everything (V2X) communication, to identify one or more objects as ground truth objects, and to determine the alignment state based on a distance between the objects identified in the aggregated lidar data and corresponding ones of the ground truth objects.

8. The system according to claim 1, wherein the processing circuitry is configured to train a deep learning neural network based on collecting the lidar data, the localization data, and an aligned lidar-to-vehicle transformation matrix, injecting different levels of alignment fault into the collected lidar data to generate modified lidar data and labeling the modified lidar data according to the alignment fault, and implementing supervised learning to train the deep learning neural network to classify alignment as one of a first alignment classification and a second alignment classification, where the first alignment classification is better than the second alignment classification.

9. The system according to claim 8, wherein the processing circuitry is configured to aggregate a plurality of frames of lidar data at corresponding time stamps to obtain aggregated lidar data, to use the lidar-to-vehicle transformation matrix and the vehicle-to-world transformation matrix to obtain the aggregated lidar data in the world coordinate system, to implement the deep learning neural network, and to determine the alignment state based on the indication of the alignment as one of a first alignment classification and a second alignment classification, where the first alignment classification is better than the second alignment classification.

10. A method in a vehicle, the method comprising:
obtaining, by processing circuitry from a lidar system, lidar data in a lidar coordinate system;
obtaining, by the processing circuitry, localization data, wherein the localization data indicates a location and orientation of the vehicle;
automatically determining, by the processing circuitry, an alignment state resulting in a lidar-to-vehicle transformation matrix that projects the lidar data from the lidar coordinate system to a vehicle coordinate system to provide lidar-to-vehicle data, wherein the alignment state is determined using the localization data;
the processing circuitry obtaining a vehicle-to-world transformation matrix to project data from the vehicle coordinate system to a world coordinate system, which is a fixed coordinate system, based on the localization data; and
the processing circuitry obtaining a plurality of frames of lidar data at corresponding time stamps, determining transformation matrices, each transformation matrix being between a first of the plurality of frames of lidar data and a subsequent one of the plurality of frames of lidar data, and obtaining a residual sum based on the transformation matrices, lidar-to-vehicle transformation matrix for each frame, and the vehicle-to-world transformation matrix for each frame.

11. The method according to claim 10, wherein the determining the alignment state includes determining that the alignment state is aligned based on an average of the residual sum for each frame being less than or equal to a threshold value.

12. The method according to claim 10, further comprising the processing circuitry aggregating a plurality of frames of lidar data at corresponding time stamps to obtain aggregated lidar data, using the lidar-to-vehicle transformation matrix and the vehicle-to-world transformation matrix to obtain the aggregated lidar data in the world coordinate system, and identifying at least a predefined minimum number of objects.

13. The method according to claim 12, further comprising the processing circuitry performing principal component analysis or a determination of density for points of the aggregated lidar data based on a type of object among the at least the predefined minimum number of objects associated with the points and determining the alignment state based on a minimum eigenvalue resulting from the principal component analysis or the density.

14. The method according to claim 10, further comprising the processing circuitry aggregating a plurality of frames of lidar data at corresponding time stamps to obtain aggregated lidar data, using the lidar-to-vehicle transformation matrix and the vehicle-to-world transformation matrix to obtain the aggregated lidar data in the world coordinate system, and identifying objects in the aggregated lidar data in the world coordinate system.

15. The method according to claim 14, further comprising the processing circuitry obtaining a high definition map, a pre-saved point cloud indicating stationary objects, or vehicle-to-everything (V2X) communication, identifying one or more objects as ground truth objects, and determining the alignment state based on a distance between the objects identified in the aggregated lidar data and corresponding ones of the ground truth objects.

16. The method according to claim 10, further comprising the processing circuitry training a deep learning neural network based on collecting the lidar data, the localization data, and an aligned lidar-to-vehicle transformation matrix, injecting different levels of alignment fault into the collected lidar data to generate modified lidar data and labeling the modified lidar data according to the alignment fault, and implementing supervised learning to train the deep learning neural network to classify alignment as one of a first alignment classification and a second alignment classification, where the first alignment classification is better than the second alignment classification.

17. The method according to claim 16, further comprising the processing circuitry aggregating a plurality of frames of the lidar data at corresponding time stamps to obtain aggregated lidar data, using the lidar-to-vehicle transformation matrix and the vehicle-to-world transformation matrix to obtain the aggregated lidar data in the world coordinate system, implementing the deep learning neural network, and determining the alignment state based on the indication of the alignment as one of a first alignment classification and a second alignment classification, where the first alignment classification is better than the second alignment classification.

18. A system in a vehicle comprising:
a lidar system configured to obtain lidar data in a lidar coordinate system; and
processing circuitry configured to obtain the lidar data and localization data, wherein the localization data indicates a location and orientation of the vehicle, and to automatically determine an alignment state resulting in a lidar-to-vehicle transformation matrix that projects the lidar data from the lidar coordinate system to a vehicle coordinate system to provide lidar-to-vehicle data, wherein the alignment state is determined using the localization data;
wherein the processing circuitry obtains a vehicle-to-world transformation matrix to project data from the vehicle coordinate system to a world coordinate system, which is a fixed coordinate system, based on the localization data; and
wherein the processing circuitry is configured to obtain a plurality of frames of lidar data at corresponding time stamps, to determine transformation matrices, each transformation matrix being between a first of the plurality of frames of lidar data and a subsequent one of the plurality of frames of lidar data, and to obtain a residual sum based on the transformation matrices, lidar-to-vehicle transformation matrix for each frame, and the vehicle-to-world transformation matrix for each frame.

19. The system of claim 18, wherein the processing circuitry is configured to train a deep learning neural network based on collecting the lidar data, the localization data, and an aligned lidar-to-vehicle transformation matrix, injecting different levels of alignment fault into the collected lidar data to generate modified lidar data and labeling the modified lidar data according to the alignment fault, and implementing supervised learning to train the deep learning neural network to classify alignment as acceptable or unacceptable.

20. The system of claim 18, wherein the processing circuitry is configured to identify objects in the aggregated lidar data in the world coordinate system and to identify at least a predefined minimum number of objects.

* * * * *